July 3, 1934.  C. CHRISTIAN ET AL  1,965,488
FLUID MOTOR
Filed Dec. 18, 1931   5 Sheets-Sheet 1
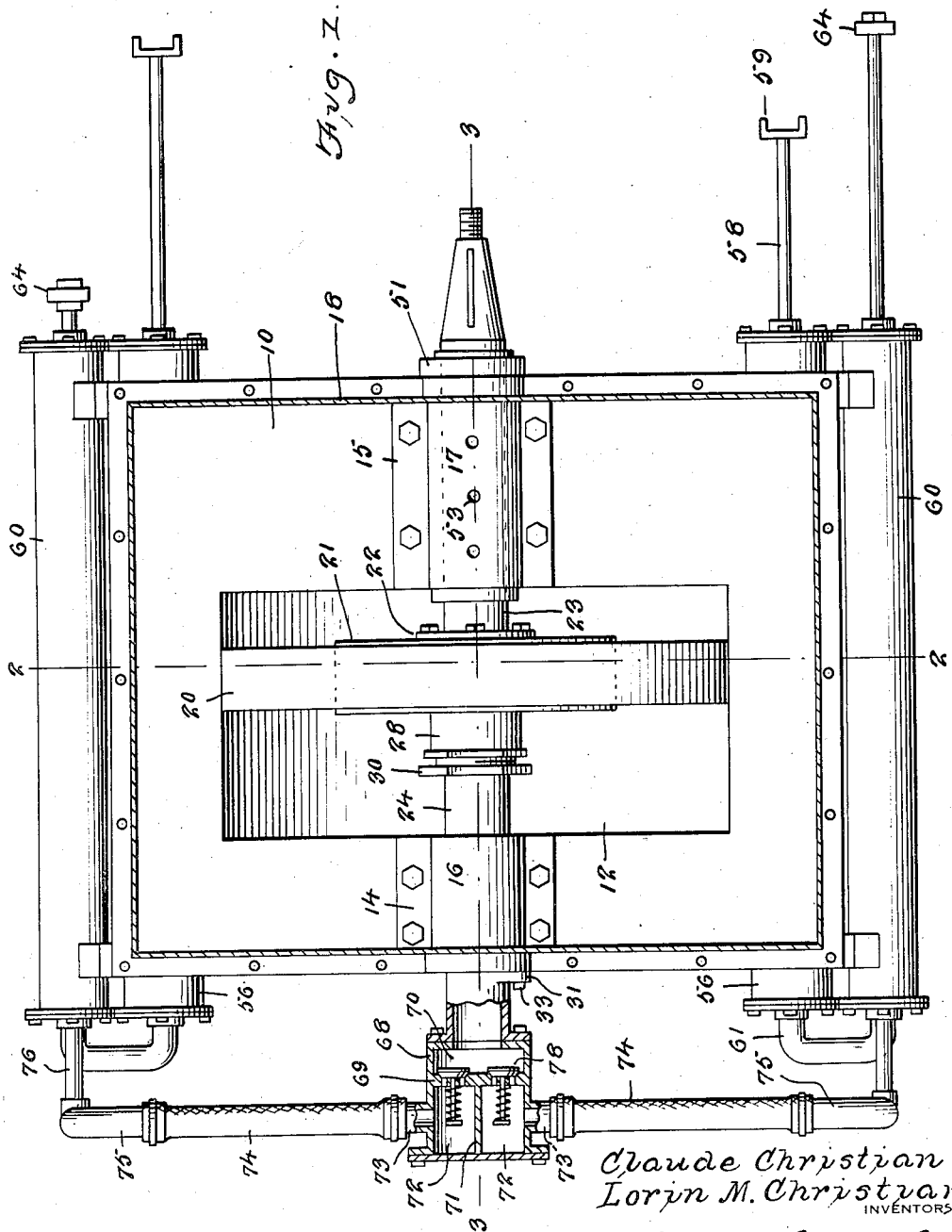

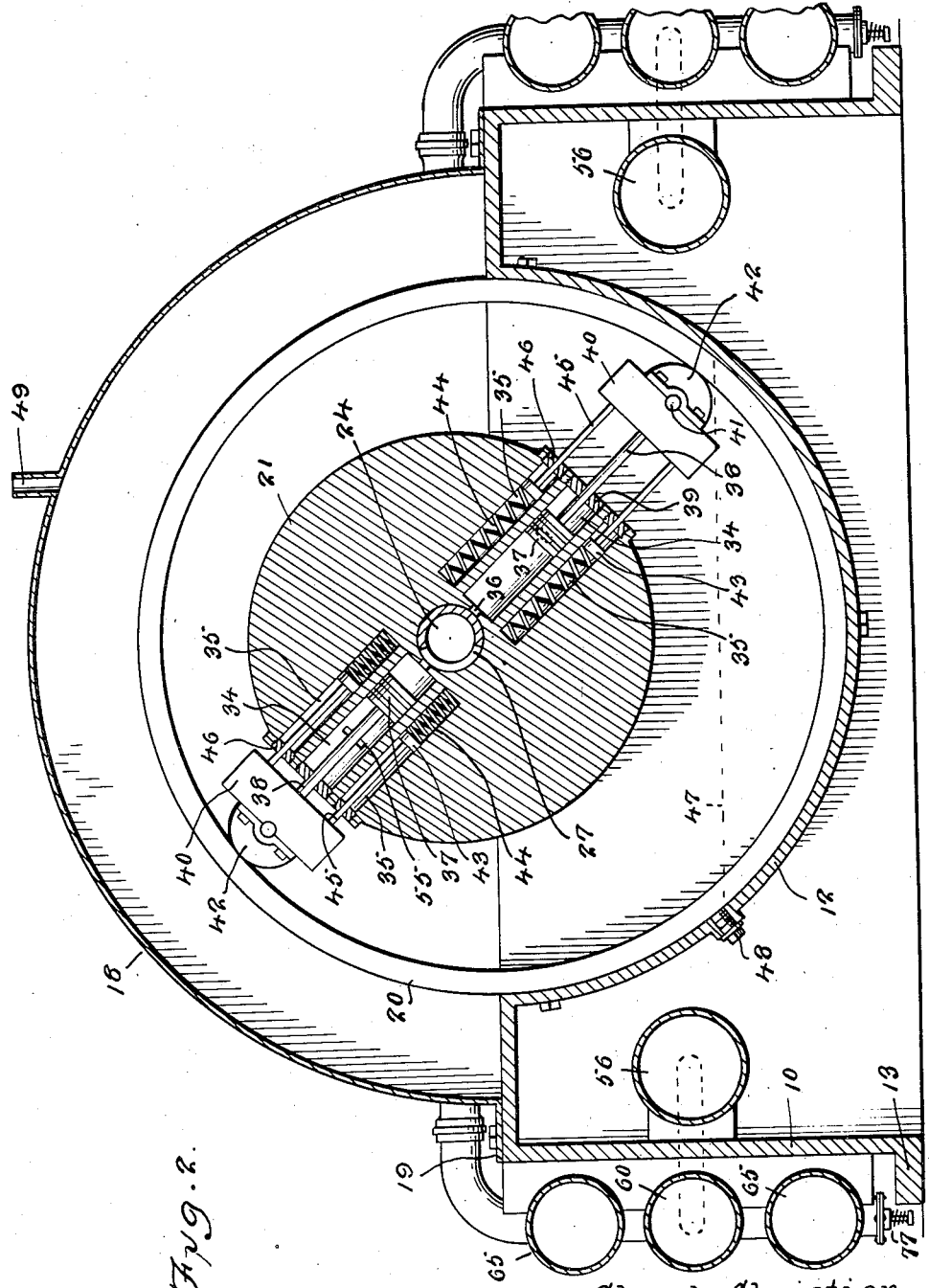

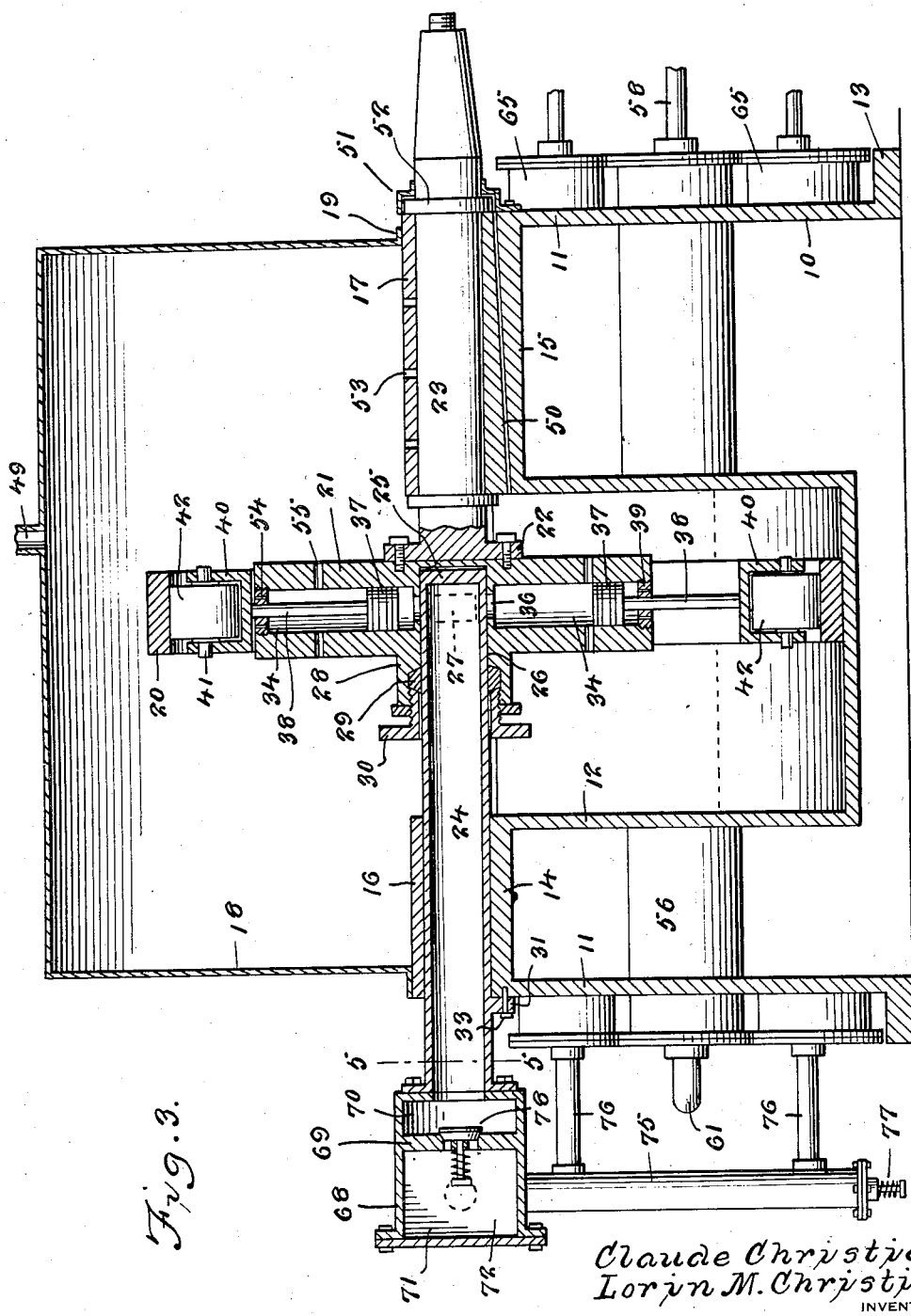

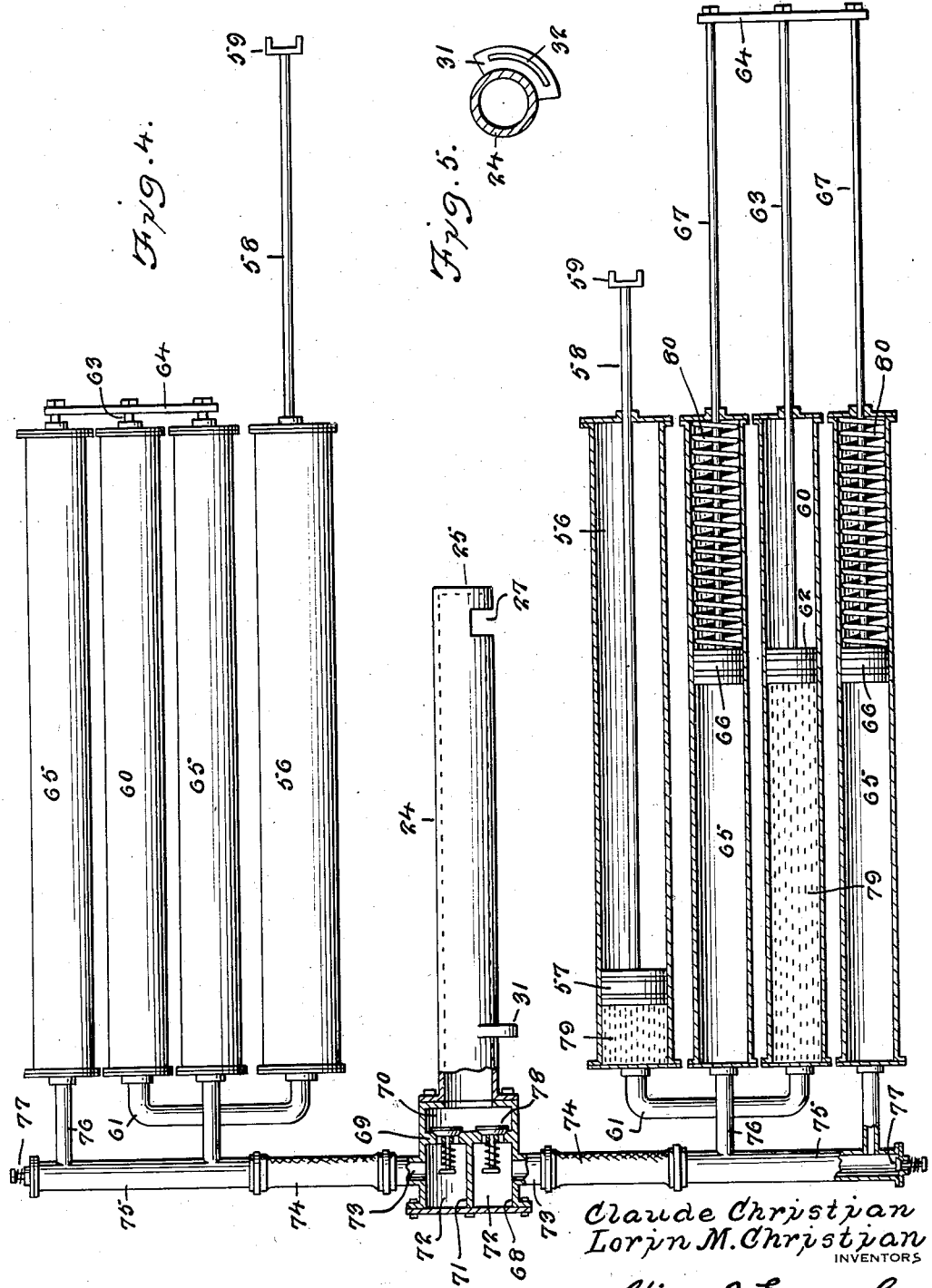

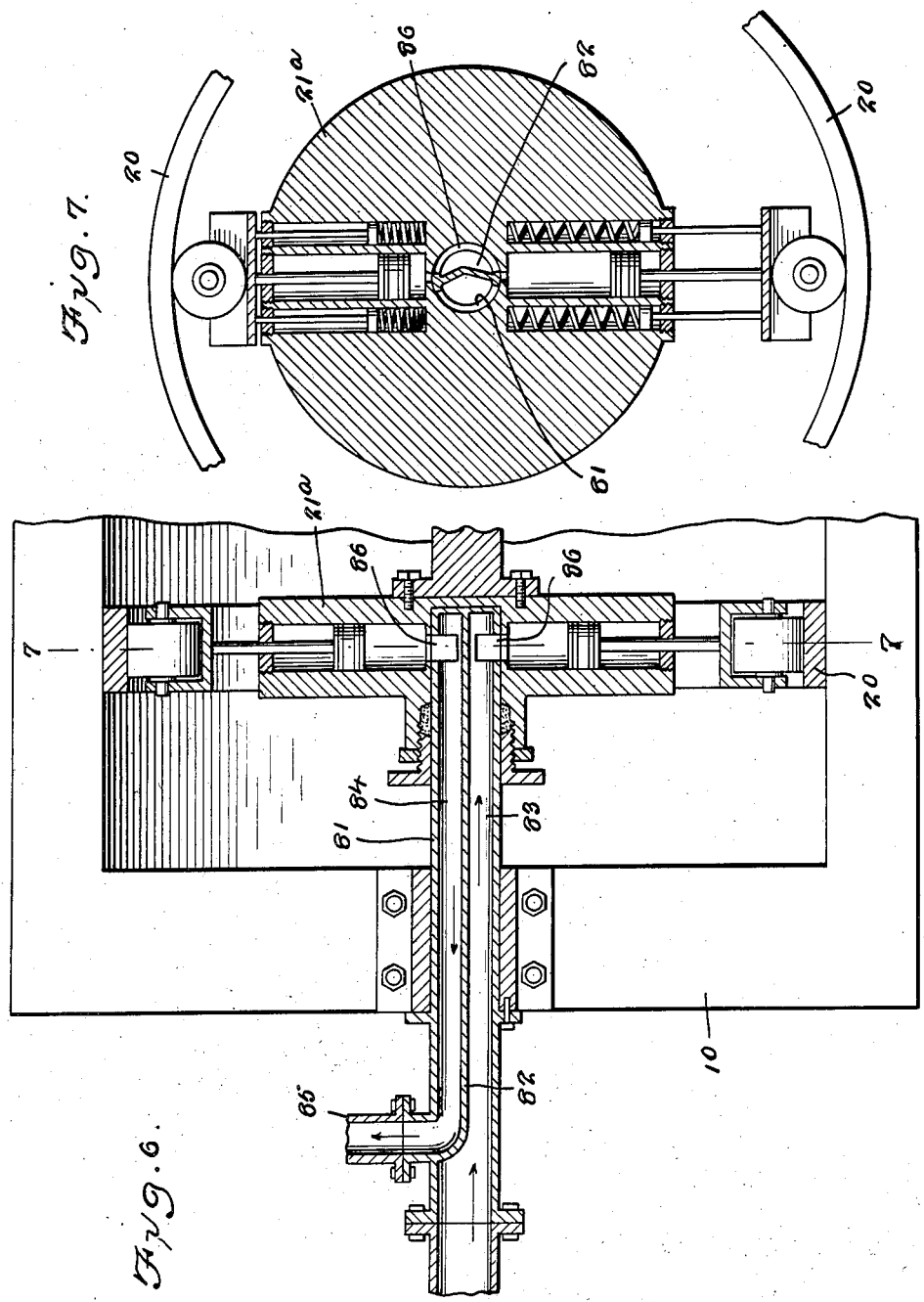

Patented July 3, 1934

1,965,488

UNITED STATES PATENT OFFICE 1,965,488

FLUID MOTOR

Claude Christian and Lorin M. Christian, Atlanta, Ga.

Application December 18, 1931, Serial No. 581,977

2 Claims. (Cl. 121—61)

The invention relates to power devices, particularly motors of the fluid pressure operated type, and has for its general object the provision of a novel motor which is fluid pressure operated and of the rotary type and which is constructed on the principle of the reaction of pistons against an eccentrically mounted track so that a tremendous leverage will be exerted for developing the maximum power with the minimum expenditure of energy which may be applied either manually or by way of an extraneously generated pressure.

An important object of the invention is to provide a motor adapted either for stationary use or for employment for driving vehicles of any sort whatsoever and which, being pressure operated, entirely eliminates any necessity for the use of gasoline or in fact any other explosive fuels or substances and which will consequently be safe, particularly if used for driving or propelling an airplane where the fire hazard is admittedly very great.

Another object of the invention is to provide a motor of this character which may be manually initially operated to provide a charge of fluid pressure capable of acting for a prolonged period of time upon the rotor so that the motor may run or operate continuously as the result of a succession of fluid pressure charges applied to it at more or less frequent intervals, the arrangement being such that but little manual effort is involved to effect the charging.

A further object is to provide a motor of this type which is entirely free from any gears, cams or other equivalent devices, and which will therefore be entirely silent in operation.

Yet another object is to provide a motor involving a splash system of lubrication so that no oil pump mechanism will be necessary for effecting proper oiling of the moving parts.

Another object is to provide a motor which if constructed originally to be operated by a manually developed charge or fluid pressure may be easily altered or modified so as to permit the use of steam pressure or the like, the principle of the operation remaining absolutely unchanged regardless of which means is resorted to for furnishing the driving power.

A more specific object is to provide a motor which is fluid pressure operated, the fluid pressure being controlled by hydraulic pressure in turn applied and controlled by manual or pedal means which may be actuated intermittently or at intervals as the occasion arises to maintain the motor in operation.

An additional object is to provide a motor possessing the above pointed out important characteristics and which will at the same time be comparatively simple and inexpensive to manufacture and install, easy to operate, positive in action, efficient and durable in service, and a general improvement in the art.

With the above and other objects and advantages in view, the invention preferably consists in the details of construction and the arrangement and combination of parts to be hereinafter more fully described and claimed, and illustrated in the accompanying drawings, in which:

Figure 1 is a top plan view of the preferred form of the invention, the casing of the fly-wheel or rotor being shown in section.

Figure 2 is a vertical cross sectional view taken on the line 2—2 of Figure 1.

Figure 3 is a vertical longitudinal section taken on the line 3—3 of Figure 1.

Figure 4 is a somewhat diagrammatic plan view showing the various cylinders flattened out or arranged in the same horizontal plan in order to facilitate the description of the action.

Figure 5 is a detailed cross sectional view taken on the line 5—5 of Figure 3.

Figure 6 is a fragmentary longitudinal section showing the device modified to use steam pressure as the driving means.

Figure 7 is a cross sectional view taken on the line 7—7 of Figure 6.

Referring more particularly to the drawings, we have shown the motor as comprising a relatively stationary hollow base indicated as a whole by the numeral 10 and comprising rectangular end portions 11 and a semi-cylindrical central portion 12. The lower edge of this base is preferably formed with an outstanding flange 13 extending throughout its periphery. This base portion is also formed with bearings 14 and 15 located at opposite sides of the intermediate or central semi-cylindrical portion 12, these bearings having bearing caps 16 and 17 respectively engaged by the end wall of a hood or shell 18 which has its opposite edges formed with attaching flanges 19 bolted or otherwise suitably secured upon the top of the base 10 throughout the lengths thereof and outwardly of the semi-cylindrical central portion 12. Bolted or otherwise suitably secured within the semi-cylindrical portion 12 of the base is a circular track 20 which is eccentric with respect to the axis of the bearings and the elements to be described mounted therein.

Located within the confines of the track 20 is the rotor or fly-wheel 21 which is secured to the flanged end 22 of a shaft 23 journalled between the bearing 15 and its cap 17, this shaft projecting beyond the hood 18 and base 10 and having its extremity suitably formed for connection with whatever mechanism is to be driven. Rigidly secured between the bearing 14 and its cap 16 is a tubular conduit 24 having a closed inner end 25 rotatably received within a socket or recess 26 in the fly-wheel or rotor 21, the inner end of this conduit being formed, within the confines of the fly-wheel with a port 27 for a purpose to be described. That space of the fly-wheel into which the conduit 24 extends is formed with a lateral extension or hub 28 which is counterbored for the reception of packing 29 engaged by a gland or packing nut 30 so as to prevent any leakage about the stationary conduit. When this conduit 24 is referred to as stationary and rigidly clamped, such is not strictly accurate, as it is capable of having limited rocking movement. In other words what was meant to be explained is that this conduit 24 does not rotate with the fly-wheel though it can be tilted or rocked back and forth owing to the provision of a lateral extension or segment 31 formed with an arcuate slot 32 through which passes a cap screw 33, the purpose of this adjustment being to permit a change in the position of the port 27 with respect to the fly-wheel for a purpose to be described.

The fly-wheel 21 is formed with two sets of diametrically opposite cylinders 34 and 35, there being two of the latter located at opposite sides of each of the former, the latter being moreover of less diameter than the former. At their inner ends the cylinders 34 communicate with relatively small ports 36 which extend to the periphery of the conduit 24 and which are consequently adapted to communicate with the interior thereof through the port 27 as the fly-wheel rotates about the conduit. Mounted for reciprocation within the cylinders 34 are pistons 37 carried by piston rods 38 slidable through spider-like guides 39, screwed into the outer ends of the cylinders, and carrying channel members 40 within which are journalled, as by spindles 41, rollers 42 which bear always against the inner periphery of the track 20. Slidable within the cylinders 35 are pistons 43 urged outwardly by coiled springs 44, within the cylinders 35, and carried by piston rods 45 slidable through spider-like members 46, closing the outer ends of the cylinders 35, and likewise connected with the channel members 40. Obviously the pistons 43 must move in unison with the pistons 37 in a manner to be explained. Attention is again directed to the fact that the fly-wheel is eccentric with respect to the track 20 as very clearly illustrated in Figure 2. The purpose of the springs 44 is of course to urge the channel members 40 and consequently the rollers 42 outwardly so that the latter will always remain in contact with the circular track 20.

To effect lubrication of the parts thus described, it should be explained that the central semi-cylindrical portion 12 of the base is intended to serve as a reservoir for oil which should be filled up to approximately the level indicated at 47 in Figure 2. The oil may be introduced at any desired point and in order that the level may be made proper it is preferable to provide a drain plug 48. If desired this same drain plug may be removed whenever it is necessary to replenish the oil supply and if an excess amount is placed within the base it is clear that such excess will run out. As the fly-wheel and the roller devices carried thereby rotate, it is obvious that the oil will be splashed about within the interior of the device though it is quite clear that it cannot escape beyond the confines of the hood 18. Incidentally it should be mentioned that this hood 18 is intended to communicate with the atmosphere through a suitable pipe or the like indicated at 49. However, this pipe is of such small size that there is no danger of any of the oil splashing about or escaping through it.

To insure proper lubrication of the working parts, the bearing 15 is represented as formed with an inclined channel 50 leading from the interior of the semi-cylindrical central portion 12 of the base to a shield 51 extending over and about a collar 52 on the shaft 23, this passage 50 acting to conduct oil to the wearing surfaces at this location. Moreover the bearing cap 17 is formed with a plurality of holes 53 so that oil falling upon it may pass through these holes and lubricate the shaft 23. As the conduit 24 does not rotate actively but is intended simply to have limited rocking movement between the bearing 14 and its cap 16 it is not necessary to provide any definite lubricating means at this point as sufficient oil will leak into the joint between the conduit 24 and its bearing structure to effect proper lubrication. The spider-like members 39 closing the outer ends of the cylinders 34 are formed with openings 54, and the spider-like members 46 closing the outer ends of the cylinders 35 are formed with similar holes so that oil splashing about within the interior of the device may enter the cylinders 34 and 35 and lubricate the interior thereof so that the various pistons may move easily and without unnecessary friction. Before passing to the description of the remainder of the mechanism, it should be explained that the fly-wheel is formed at each cylinder 34 with ports 55 establishing communication between the interior of the cylinders and the interior of the hood 18 and consequently the atmosphere.

Suitably mounted with respect to the base 10 and extending longitudinally thereof at opposite sides of the center are cylinders 56 within each of which is slidably mounted a piston 57 carried by a piston rod 58 equipped with a pedal 59, there being two of such pedals, one associated with each cylinder 56, and said pedals being adapted to be pressed in alternation under some circumstances or together under certain other circumstances as will be explained. Located outwardly of the cylinders 56 and suitably mounted upon the base 10 are other cylinders 60 connected with the adjacent cylinders 56 at one end as by pipes 61 and each containing a slidably mounted piston 62 carried by a piston rod 63 projecting beyond the other end and carrying a cross-head or transverse bar 64. The cylinders 56 and 60 are adapted to contain liquid such as oil which is adapted to be transferred from the cylinders 56 to the cylinders 60 and back again in the operation of the device in a manner to be described. At each side of the machine we also provide another pair of cylinders 65 within each of which is a piston 66 carried by a piston rod 67, these piston rods being represented as located at opposite sides of the piston rod 63 and likewise secured to the cross-head or transverse bar 64. The cylinders 65 are intended to contain air only as they have no connection with the oil containing cylinders 56 and 60.

Suitably secured upon the outer end of the conduit 24 is a casing 68 provided with a transverse partition 69 defining a compartment 70, and likewise provided with a longitudinal partition 71 defining a pair of compartments 72 from which extend pipe sections 73 connected by flexible hose members 74 with pipes 75 from which extend lateral branches 76 leading into the ends of the cylinders 65. At their outer ends, the pipes 75 are provided with inwardly opening spring pressed check valves 77 permitting inlet of air in a manner to be explained. The partition 69 in the valve casing 68 is provided at each of the compartments 72 with an inwardly opening spring pressed check valve 78 which opens to permit passage of air through the conduit 24 to the fly-wheel but which will close in the event of any back pressure against them.

The operation of the device up to this point or as above described is as follows: Initially the cylinders 56 and 60 must be charged, or in other words partly filled, with the proper quantity of oil indicated at 79 and it is obvious that any desired filling opening, with a suitable closure therefor, may be provided at any desired location. Initially, one piston rod 58 with its pedal 59 is supposed to be in its outermost position while the other is in its innermost position as clearly indicated in Figure 4. To start the motor, the operator places his foot upon the pedal 59 which extends out the farthest and presses upon it so that the piston rod 58 connected therewith will move the piston 57. As this is done the oil in advance of the piston 57 is forced through the pipe 61 into the cylinder 60 and will act against the piston 62 and force the same outwardly. In view of the fact that the piston rod 63 carrying the piston 62 is connected with the transverse bar or cross-head 64 and this same bar or cross-head is connected by the piston rods 67 with the pistons 66, the pistons 66 will be similarly moved outwardly so that the springs 80 engaging against them will be compressed. When the operator then releases the pressure upon the pedal 59 which he has thus depressed, the springs 80 will act to force the pistons 66 forwardly so that the air in advance of them, which air was previously drawn in through the check valve 77, will be forced out through the branch pipes 76, into the pipe 75 and through the hose 74 into the compartment 72 in the valve casing 68. The air entering the compartment 72 forces the check valve 78 therein to open and then passes into the conduit 24 and through the port 27 and thence through one of the ports 36 into one cylinder 34. The air thus entering the cylinder 34 forces the piston 37 therein outwardly. As the piston rod 38 connected with the piston 37 is also connected with the channel member 40 and as this member 40 is connected by the piston rods 45 with the pistons 43 in the cylinders 35, the pistons 43 move correspondingly with the piston 37. As the roller 42 carried by the channel member 40 is thus forced outwardly it reacts against the eccentrically arranged track 20 and this causes the fly-wheel 21 to be rotated. When the piston 37 reaches the outer limit of its movement the compressed air acting against it escapes through the ports 55 into the interior of the hood 18 and then through the pipe 49 to the atmosphere so that there will be no back pressure. After one cylinder 34 has passed by the port 27 the next cylinder 34 comes into communication therewith through the port 36 and the action is repeated for the second set of pistons. The rotation of the fly-wheel of course causes rotation of the shaft 23 and power may be taken therefrom for any desired purpose whatsoever.

When the pistons 66 are urged forwardly by the springs 80 as above described it is clear that the piston 62 moves with them and the result is that the oil 79 is forced out of the cylinder 60 back into the cylinder 56 so that the pedal 59 will be returned to its outwardly projected position. When the first pressed pedal starts to return to its outwardly extended position it is intended that the operator press upon the other pedal 59 so as to bring into play the compressing action of the compressors at the opposite side of the machine. The mechanism being duplicated at both sides of the machine it is quite apparent that it is a simple matter to operate the two sets of compressors in alternation so that the proper degree of fluid pressure may be supplied to the motor almost continuously so that there will be no interruption whatever to its operation.

The speed and power of the motor may be increased by the operator pressing upon the pedals 59 in alternation rather frequently whereas if a lower speed or less power is desired this may be done at more infrequent intervals or at longer intervals. Moreover, if it is desired to stop the motor it is merely necessary for the operator to place his feet upon both of the pedals 59 and hold them there whereupon the motor will come to rest. A feature of importance is the rockable mounting of the conduit 24, it being noted that by virtue of the provision of the arcuate slot 32 in the segment 31 the conduit may be adjusted so as to vary the position of the port 27 and thereby effect a variation in the timing of the motor. Moreover, by turning the conduit 24 as far as possible the direction of rotation of the motor may be reversed. Owing to the high leverage developed on account of the eccentricity of the fly-wheel with respect to the circular track it is apparent that a high degree of power will be generated. Furthermore, the effort involved in pressing the pedals 59 is not excessive and in fact may not be very much more than is required for pushing out the clutch and applying the brakes, for instance, on an automobile.

It is readily conceivable that the construction may be easily modified to permit the motor to be operated by steam instead of air placed under pressure by the pedal means previously described. In order to adapt the motor for the use of steam, it is merely necessary to omit the compressor mechanism above described and to replace the conduit 24 by a conduit 81 mounted in the same manner and likewise fitting rotatably within the fly-wheel 21, the construction of which need not be altered in any respect whatsoever. However, the conduit 81 is formed in two sections or provided with a longitudinally extending partition 82 defining an inlet passage 83 and an exhaust passage 84, the former being connected with a suitable source of steam and the latter leading to a lateral outlet or discharge or exhaust pipe 85. When it was stated immediately above that there was no change in the fly-wheel, it should be explained that there is one slight difference, namely that the ports 55 described in connection with the first form of the invention are omitted in this modification. The conduit 81 is provided within the confines of the fly-wheel which is given the reference character 21a in this instance with a pair of ports 86 replacing the single port 27 in the first described variation, one of these ports constituting an inlet and the other an outlet. Instead of the exhaust steam coming out through the hood 18 as described in connection with the compressed air it passes out through the passage 84 as it would not be advisable or satisfactory to have the exhaust steam discharging into the hood as it would condense and produce an objectionable condition. This form of the invention operates in exactly the same manner as the first form except that the fluid pressure is in the form of steam instead of compressed air placed under compression by the pedal means.

In all forms of the invention, it will be observed that regardless of whether compressed air or steam be introduced within the rotor, that is to say within the pistons in the rotating fly wheel, the actual result will be the same insofar as the development of power is concerned. Attention is directed to the fact that as there are no gears, cams, or the like and no elaborate valve mechanism there is practically nothing to get out of order. Moreover there is no explosive fuel or the like used and it is consequently apparent that the operation of the motor will be entirely safe and unaccompanied by the dangers inherent to the use of gasoline or the like. As the various detailed operation has been described from time to time above it is thought that a reiteration thereof is unnecessary and that the construction, operation and advantages will be readily apparent to one skilled in the art without further explanation.

While we have shown and described the preferred embodiment of the invention, it should be understood that we reserve the right to make all such changes in the details of construction and the arrangement and combination of parts as will not depart from the spirit of the invention or the scope of the subjoined claims.

Having thus described the invention, we claim:

1. An engine of the character described comprising a housing having bearings in its opposite ends, a circular track fixed within the housing in eccentric relation to said bearings, a shaft journaled through one bearing, a rotor secured at the center of one side to the inner end of said shaft and having a central bearing socket in its opposite side, a fluid pressure inlet conduit rotatably mounted within the other bearing and having a closed end rotatably engaged within said bearing socket, radial cylinders formed within the fly-wheel and having inlet ports at their inner ends, said conduit having a port adjacent its closed end adapted to register with the ports at the inner ends of the cylinders, pistons slidably mounted within said cylinders and having piston rods projecting outwardly, other cylinders formed within the fly-wheel at the sides of the radial cylinders and parallel therewith supporting members mounted on the outer ends of said piston rods, rollers journaled in said supporting members and bearing against the inner periphery of said track, and outwardly spring pressed pistons mounted within the side cylinders and having piston rods connected with said supporting members for maintaining the rollers in constant engagement with the track.

2. An engine of the character described comprising a housing having bearings in its opposite ends, a circular track fixed within the housing in eccentric relation to said bearings, a shaft journaled through one bearing, a rotor secured at the center of one side to the inner end of said shaft and having a central bearing socket in its opposite side, a fluid pressure inlet conduit rotatably mounted within the other bearing and having a closed end rotatably engaged within said bearing socket, sets of radial cylinders formed within the rotor and having inlet ports at their inner ends, said conduit having a port adjacent its closed end adapted to register with the ports at the inner ends of the cylinders, pistons slidably mounted within said cylinders and having piston rods projecting outwardly, channeled members mounted on the outer ends of said piston rods, rollers journaled in said channeled members and bearing against the inner periphery of said track, cylinders formed within the fly-wheel at the sides of the radial cylinders and parallel therewith, outwardly spring pressed pistons mounted within the parallel cylinders and having piston rods connected with said channeled members for maintaining the rollers in constant engagement with the track, an arm on said conduit having a segmental slot therein, and a securing member passing through said slot and into the housing whereby the conduit may be rotatably adjusted and secured in adjusted position for varying the time of registration of the second and third named ports.

CLAUDE CHRISTIAN.
LORIN M. CHRISTIAN.